United States Patent [19]

Berger et al.

[11] 3,759,968
[45] Sept. 18, 1973

[54] SILYL MALEATES AND POLYSILOXANE MALEATES

[75] Inventors: Abe Berger; Terry G. Selin, both of Schenectady, N.Y.

[73] Assignee: General Electric Company, Waterford, N.Y.

[22] Filed: May 17, 1971

[21] Appl. No.: 144,306

[52] U.S. Cl. 260/448.2 Q, 260/448.2 E, 260/448.2 B, 260/448.8 R, 260/46.5 E, 260/46.5 Y
[51] Int. Cl. ............................ C07f 7/08, C07f 7/12
[58] Field of Search ............. 260/448.8 R, 448.2 E, 260/448.2 B, 448.2 Q

[56] References Cited
UNITED STATES PATENTS

| | | | |
|---|---|---|---|
| 2,823,218 | 2/1958 | Speier et al. | 260/448.2 E |
| 2,970,150 | 1/1961 | Bailey | 260/448.8 R X |
| 2,922,806 | 1/1960 | Merker | 260/448.2 B |
| 3,317,369 | 5/1967 | Clark et al. | 260/448.8 R |
| 3,453,230 | 7/1969 | Plueddemann | 260/448.8 R X |
| 3,258,477 | 6/1966 | Plueddemann et al. | 260/448.8 R |

OTHER PUBLICATIONS

Noll, "Chemistry and Technology of Silicones," Academic Press, N.Y. (1968), pps. 81, 92, and 110.

Primary Examiner—Daniel E. Wyman
Assistant Examiner—Paul F. Shaver
Attorney—Donald J. Voss, E. Philip Koltos, Frank L. Neuhauser, Oscar B. Waddell and Joseph B. Forman

[57] ABSTRACT

Silyl maleates and fumarates and polysiloxane maleates and fumarates useful as glass sizing agents are prepared in accordance with the present invention. The silyl maleates and polysiloxane maleates and fumarates are formed by reacting either the cis- or trans- 1,2-bis-carbalkoxyethylenes having an unsaturated alkenyl group therein with a hydrogen silane of hydrogen polysiloxane in the presence of a platinum catalyst.

12 Claims, No Drawings

SILYL MALEATES AND POLYSILOXANE MALEATES

BACKGROUND OF THE INVENTION

This invention relates to silyl maleates and fumarates and polysiloxane maleates and fumarates and, in particular, the invention relates to silyl maleates and fumarates and polysiloxane maleates and fumarates obtained by reacting hydrogen silanes and hydrogen polysiloxanes with the cis- or trans- 1,2-bis(carbalkenoxy)ethylenes in an SiH-olefin platinum catalyzed addition reaction.

The maleates including such compounds as diallyl maleate and fumarates are useful intermediates and they are used in various processes to produce maleate compounds useful for a variety of purposes.

At the present time, more and more glass fibers are incorporated into various compositions or laminate structures. In order for these glass fibers to fully serve their purpose in providing a laminate or composition with sufficient hardness or stiffness, it is necessary to size the glass fibers with various materials. It has been found that various silicone compounds are eminently useful for sizing glass fibers. However, research has been pursued to find silicone compounds which are even better glass sizing agents than the silicone compounds presently available for this purpose.

In addition, at the present time, there has been impetus to obtaining protective coatings on various materials such as furniture which are used indoors and outdoors. These protective materials are applied to materials such as wood, steels, aluminum, iron, and plastics so as to improve the weatherability of the material, as well as to protect the surface underneath from etching, scratching, and other abrasive types of contact with the materia. Polyester compositions are commonly used for such application. However, the weatherability of such polyester protective coatings leave something to be desired. It is well known that silicone compounds and silicone compositions have excellent weatherability characteristics. Thus, it has been proposed to form a composition of a silicone compound and a polyester composition to provide a protective coating for the various materials indicated above.

It is one object of the present invention to provide a silyl maleate which is useful for sizing glass fibers.

It is another object of the present invention to produce polysiloxane maleate which is useful in the sizing of glass fibers.

It is still another object of the present invention to provide a process for producing silyl maleates and polysiloxane maleates. These and other objects of the present invention are accomplished by means of the invention set forth below.

SUMMARY OF THE INVENTION

In accordance with the objects set forth above, there is provided by the present invention a silyl maleate or fumarate useful for the sizing of glass comprising a compound selected from the group, (1) 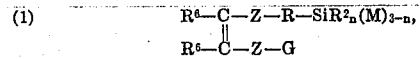

and (2) 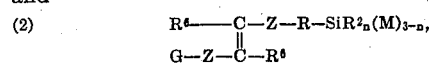

where Z is selected from

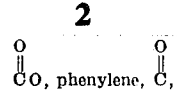

CONH and $CONR^2$, G is selected from hydrogen, R'' and $R^4SiR^2_n(M)_{3-n}$, where R' is selected from monovalent hydrocarbon radicals and halogenated monovalent hydrocarbon radicals, R and $R^4$ are divalenthydrocarbon radicals, $R^2$ is selected from monovalent hydrocarbon radicals and halogenated monovalent hydrocarbon radicals, M is selected from $R^3O$ and

radicals, $R^3$ is selected from monovalent hydrocarbon radicals and halogenated monovalent hydrocarbon radicals, $R^6$ is selected from hydrogen and alkyl radicals of up to 15 carbon atoms and n is a whole number that varies from 1 to 3.

There is also included within the scope of the present invention, polysiloxane maleates comprising a compound selected from the group, (3) 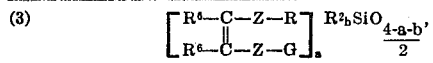

and (4) 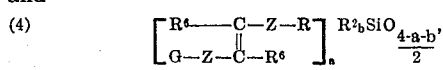

where Z is selected from

CONH and $CONR^2$, G is selected from hydrogen, R' and $R^4H_cR^2_dSiO_{(3-c-d/2)}$, where R' is selected from monovalent hydrocarbon radicals and halogenated monovalent hydrocarbon radicals, where R and $R^4$ are divalent hydrocarbon radicals, $R^2$ is selected from monovalent hydrocarbon radicals and halogenated monovalent hydrocarbon radicals, a varies from 0.005 to 2.0, b varies from 1.0 to 2.5, the sum of a plus b varies from 1.005 to 3.0, c varies from 0 to 1.0, d varies from 1.0 to 2.5, and the sum of c plus d varies from 1.0 to 2.0.

These silyl maleates and fumarates and polysiloxane maleates and fumarates are obtained by reacting either a cis- or trans- 1,2-bis(carbalkenoxy)ethylene with a hydrogen halosilane of hydrogen polysiloxane in the presence of a platinum catalyst. In the case where a rea-tant is hydrogen halosilane, the resulting product is then further reacted with an alcohol, preferably in the presence of an acid acceptor, such as trialkyl amine, so as to substitute an alkoxy group for the halo group on the silicon atom. If desired, a hydrogen alkoxysilane may be reacted directly with the cis- or trans- 1,2-bis(carbalkenoxy)ethylene such that the hydrogen adds onto the unsaturated group in the terminal radical of the cis- or trans- ester. However, with the alkoxy groups in the silane, the reaction in the presence of a platinum catalyst proceeds somewhat more slowly than in the case when there is present in the silane a halogen in place of the alkoxy groups.

DESCRIPTION OF THE PREFERRED EMBODIMENT

The radicals represented by R', $R^2$ and $R^3$ are commonly known radicals normally associated with silyl compound polysiloxane compounds. For instance, these radicals may be aryl radicals and halogenated aryl radicals, such as phenyl, chlorophenyl, silyl, tolyl, etc.; aralkyl radicals such as phenyl, ethyl, benzyl, etc; aliphatic, haloaliphatic and cyaloaliphatic such as alkyl, alkenyl, cycloalkyl, haloalkyl, including methyl, ethyl, propyl, chlorobutyl, cyclohexyl, etc; cyanoalkyl radicals such as cyanoethyl, cyanopropyl, cyanobutyl, etc. Preferably, the radicals $R'$, $R^2$ and $R^3$ have no more than 8 carbon atoms. In particular, it is preferable that the radicals $R^2$ and $R^3$ are methyl or ethyl. In the same vein, preferably the radical $R'$ is an unsaturated monovalent hydrocarbon radical such as alkenyl of no more than 8 carbon atoms and preferably $R'$ is vinyl or allyl. The radicals represented by R and $R^4$ are preferably alkylene and arylene radicals such as ethylene, phenylene, trimethylene, tetramethylene, etc. Preferably, the radicals R and $R^4$ have no more than 20 carbon atoms and preferably R and $R^4$ are phenylene or propenylene.

The silyl maleate and fumarate compounds of formulas (1) and (2) are prepared by reacting compounds of the formula, (5) 

and (6) 

where Z is as previously defined, $R^5$ is an unsaturated monovalent hydrocarbon radical of less than 20 carbon atoms such as allyl, and $G'$ is selected from hydrogen and $R^5$ radicals.

These above compounds may be reacted with a silane of the formula, (7) 

in the presence of a platinum catalyst, where $R^2$ is as defined previously, X is a halogen and preferably chlorine, and $n$ is a whole number that varies from 1 to 3. If $G'$ is the same as an $R^5$ radical, then the hydrosilane of formula (7) may add on to both of the unsaturated linkages in both $R^5$ radicals. However, even if $G'$ is equal to an $R^5$ radical such as allyl, which the $R^5$ radical is also equal to, monoaddition can be carried out by controlling the stoichiometry. Thus, if one mole of the silane of formula (7) is reacted with either one mole of the maleates of formula (5) or formula (6), then only the mono- addition product will be obtained. If, on the other hand, two moles of the hydrosilane of formula (7) is reacted with one mole of either the trans- or cis-maleates of formulas (5) and (6), then the di- addition product will be obtained. The reaction is preferably carried out at room temperature and a solvent is not required. However, a solvent may be used for the purpose of allowing the platinum catalyst to activate the reagents. In that case, any inert solvents such as toluene, xylene, mineral spirits, benzene, etc. can be used. Suitable catalysts for the addition of the silane of formula (7) to the maleates and fumarates of formulas (5) and (6) are various platinum and platinum compound catalysts known in the art. These catalysts include elemental platinum in the finely divided state which can be deposited on charcoal or aluminum, as well as various platinum compounds such as chloroplatinic acid, a platinum hydrocarbon complex of the type shown in U.S. Pat. Nos. 3,159,601, 3,159,602, as well as the platinum alcoholic complexes prepared from chloroplatinic acid which are described and claimed in Lamoreaux U.S. Pat. No. 3,220,972. Preferably, the platinum catalyst is added to the hydrosilane located in the reaction chamber to which may be added a solvent and then the unsaturated maleate is slowly added to the reaction mixture at the reaction temperatures described above. Whether elemental platinum or one of the platinum complex catalysts is used, the catalyst is generally used in amounts sufficient to provide about $10^{-4}$ to $10^{-6}$ moles of platinum per mole of the maleate reactants.

As mentioned previously, the reaction is effected by adding the hydrosilane to an inert solvent, such inert solvents being selected from the group of benzene, toluene, xylene, mineral spirits and other inert solvents. Then the reaction mixture is preferably heated to 25°C to 75°C before the addition of the maleate. The maleate is then added to the hydrosilane solvent mixture at an addition rate so as to maintain the reaction temperature in the range of 25°C to 75°C during the reaction. Preferably, the reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When at least 95% of the SiH silane has been converted to the reaction product, the reaction mixture may be cooled and the reaction may be considered to have proceeded to a sufficient extent for the conversion of the silyl maleate or fumarate. After the silyl maleate or fumarate, whether it is mono-substituted or di-substituted, product is obtained, there are still halogen atoms attached to the silicon atoms which have to be substituted; otherwise, the resulting compound is corrosive.

The halosilyl maleate compound is reacted with an alcohol or an acid of the formula $R^3OH$, $R^3COOH$, where $R^3$ is selected from monovalent hydrocarbon radicals and halogenated monovalent hydrocarbon radicals and is preferably a saturated monovalent hydrocarbon radical such as an alkyl radical of no more than 8 carbon atoms.

In preparing the reaction mixture, one mole of the halosilyl maleate is reacted with $3-n$ moles of the alcohol or acid, that is the number of moles of the alcohol or acid must be equivalent to the number of moles of the halogen atached to the silicon atom, or in excess. The reaction is carried out at reduced pressures and moderate temperatures when it is carried out in the absence of a solvent. The reduced pressures and moderate temperatures are preferred so the acid that is formed as a result of the alkoxylation or acylation will be boiled off and will not initiate cross-linking between the silicon atoms. Thus, it is preferred that the reaction be carried out at less than 100 mm of mercury pressure and at temperatures in the range of 75°C to 100°C.

As an alternative, the reaction may be carried out in the presence of a trialkyl amine such as trimethyl amine, which trialkyl amine will react with the hydrogen chloride given off so that the acid does not initiate cross-linking between the silicon atoms. As another alternative, xylene may be used as a solvent in which solvent hydrogen chloride is not soluble, so that during the course of the reaction, the acid which is insoluble in xylene is given off and does not result in cross-linking. The alkoxylation may also be carried out with methyl orthoformate at room temperature which allows the substitution of methoxy groups for the halogen groups on the silicon atom without initiating cross-linking. All of the above procedures may be used to alkoxylate or substitute the halogen on the silicon atom for an alkoxy group.

As an alternative, both the maleates and fumarates of formulas (5) and (6) may be reacted with a hydroalkoxy-silane in place of the hydrohalosilane of formula (7). However, with the alkoxysilane, the SiH-olefin addition in the presence of a platinum catalyst proceeds more slowly than in the case where the silane of formula (7) is used.

To obtain the polysiloxane maleates or fumarates of formulas (3) and (4), the maleates and fumarates of formulas (5) or (6) having one or two $R^5$ unsaturated monovalent hydrocarbon groups thereon is reacted with a hydrogen polysiloxane of the formula, (8) $H_a R^2_b SiO_{(4-a-b/2)}$, in the presence of a platinum catalyst, where $R^2$ is as defined previously and $a$ varies from 0.005 to 2.0 and $b$ varies from 1.0 to 2.5, the sum of $a$ plus $b$ being equal to 1.005 to 3.0, inclusive.

The reaction conditions, as well as the platinum catalyst and the type of platinum catalyst and the concentration of the catalyst, is that as set forth previously for the reaction between the maleates and fumarates of formulas (5) and (6) and the hydrohalosilane of formula (7). It can be appreciated that G in formulas (3) and (4) may be equal to hydrogen, to R' which is most preferably an alkenyl monovalent radical or G can be equal to the radical, (9) $R^4 H_c R^2_d SiO_{(3-c-d/2)}$, where $R^4$, $R^2$, $c$ and $d$ are as defined previously.

In order to obtain the compound where G is equal to the hydropolysiloxane radical set forth above, one mole of the maleate or fumarate of formulas (5) or (6) separately or together, is reacted with one mole of the hydrogen polysiloxane of formula (8). The resulting compound will be a maleate or fumarate having an $R^5$ radical thereon and having a G radical thereon which is equal to the polysiloxane of formula (9), i.e., a majority of the product formed will contain an $R^5$ terminal group and a G terminal group, where the G terminal group comprises a hydropolysiloxane of formula (9). The SiH-olefin addition is carried out in the same way as the SiH-olefin addition which is carried out when the hydrogen halosilane of formula (7) is used. The resulting product may then be reacted with the hydropolysiloxane of formula (8) under the same conditions as discussed previously. Preferably, one mole of the hydrogen polysiloxane of formula (8) is reacted with one mole of the cis- or trans- isomer of formulas (5) and (6), where G' is equal to the radical of formula (9). The resulting product is that set forth in formulas (3) and (4).

The hydrohalosilanes of formula (7) are well known compounds as shown in Organosilicon Compounds by Eaborn, p. 24 (1960), Butterworth Scientific Publications. The hydrogen polysiloxane of formula (8) is also a well known compound in the art. The hydrogen polysiloxane may be obtained by hydrolyzing hydrogenorganochlorosilanes with diorganodichlorosilanes and alternatively, in order to obtain more pure products, the hydrogenorganochlorosilanes and the diorganodichlorosilanes may be hydrolyzed to produce a mixture of cyclic and linear polysiloxanes. The cyclic polysiloxanes are then boiled off and collected. The organo groups in the cyclics may be any organic group but it is preferably methyl, phenyl, and in some cases, vinyl. The different diorgano cyclic materials or monoorganohydrogen cyclic materials are then mixed together and equilibrated in the presence of a polymerization catalyst such as potassium hydroxide, or in the alternative, in the presence of a strong acid such as toluene sulfonic acid. To the mixture there is also added chain-stoppers such as hexamethyldisiloxane or dihydrogentetramethyldisiloxane and the resulting mixture equilibrated in the temperature range of 150°C to 200°C for a period of 4 to 8 hours. The amount of the disiloxane chain-stopper that is used with respect to the cyclic polysiloxanes will determine the chain length of the resulting hydrogenpolysiloxane polymer. In general, the hydrogenpolysiloxanes most utilized in the present invention are those of formula (8), where $a$ and $b$ and the sum of $a$ and $b$ have the values given above.

Both the cis- and trans- isomers of formulas (5) and (6) are also well known materials. Although in the case where Z is equal to a group other than carboxyl, they may not be as readily available. However, even the case where Z is equal to a phenylene, CO, CONH and $CONR^2$ group, the maleates of formulas (5) and (6) can be easily synthesized through procedures well known in the art. The most common of the maleates known is diallyl maleate and its isomeric fumarate and is the preferred reactant of formulas (5) and (6) in the present invention.

To better teach those skilled in the art the manner by which the maleates of formulas (5) and (6) are obtained, the process for obtaining diallyl maleate is hereby set forth.

Benzene is reacted at a temperature range of 250°C to 400°C and preferably above 300°C, in the presence of air in a vapor phase reaction to produce maleic anhydride. In order to carry out the reaction, vanadium pentoxide is a necessary catalyst. The reaction takes place without a solvent and, in addition to maleaic anhydride, there is produced carbon dioxide and water, which are given off. The maleaic anhydride may then be reacted with any unsaturated alcohol at room temperature to produce the mono-substituted maleaic acid in accordance with the reaction set forth below:

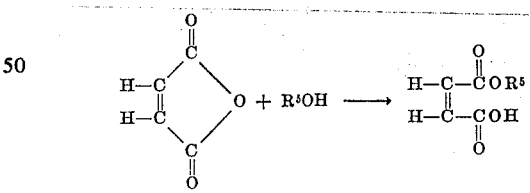

The resulting product of the reaction set forth above may then be reacted with another mole of an unsaturated acid such as allyl alcohol, in the presence of a strong acid such as toluene sulfonic acid, and a solvent to produce the diunsaturated alcohol substituted maleate which, in the case of diallyl maleate, would have the structure as follows:

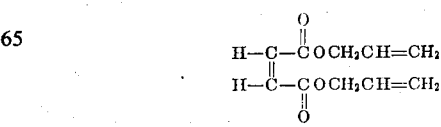

This resulting diallyl maleate is directly within the structure of formula (5). To obtain the trans- compound, the cis- diallyl maleate or other type of cis- maleate or cis- unsaturated alcohol substituted maleate is equilibrated at a temperature range of 75°C to 150°C in the presence of hydrogen chloride gas. As a rsult of the reaction, there is obtained a mixture of the cis- and trans- isomers which can be separated by fractionation. When the second mole of unsaturated alcohol, such as allyl alcohol, is reacted with the mono-allyl maleaic acid, a solvent is preferably used and such solvent is selected from commonly inert solvents such as toluene, xylene, mineral spirits, benzenes, and other types of solvents. This reaction, which is carried out in the presence of a strong acid catalyst, may utilize any type of strong acid catalyst, one example of which is toluene sulfonic acid and another example of which is trifluoromethanesulfonic acid.

To obtain the isomers of formulas (5) and (6), where Z is equal to a CONH or $CONR^2$, maleaic anhydride is once more used as a starting material. It should be mentioned at this point that when Z is equal to CONH, then in the SiH-olefin addition, the hydrogen halosilane of formula (7) cannot be used but instead, there must be used a hydrogen alkoxysilane as mentioned previously. The reason for this is that the NH group reacts with the chlorine groups of the compound of formula (7).

To illustrate the manner by which the maleate of formula (5), where Z is equal to CONH, the following reactions are set forth:

(A)

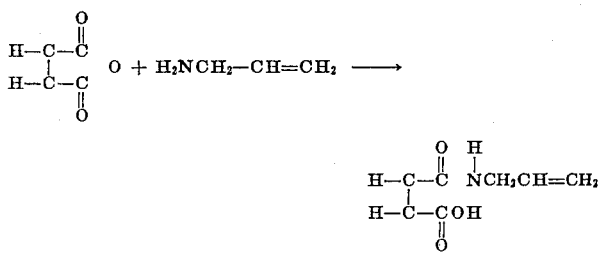

(B)

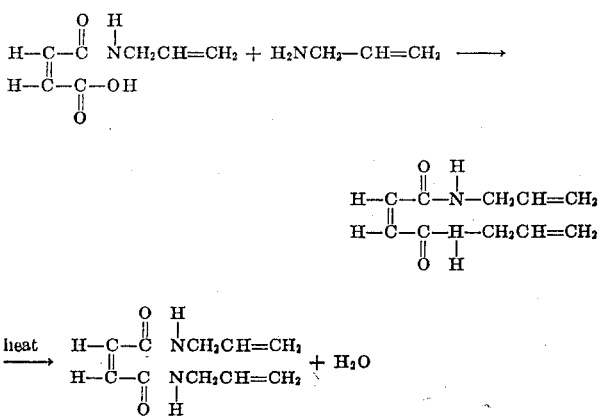

In reaction (A), malaic anhydride is reacted with an allyl amine at room temperature and without any solvent to obtain the resulting maleamic acid. The results are examplified by reaction (A). The malaic acid reaction product of reaction (A) is then taken and placed in an inert solvent such as xylene and heated at 60°C to 80°C and while the solvent and maleamic acid mixture is heated another mole of allyl amine is added to produce the amine salt which is pyrolyzed to the desired product as shown in reaction (B). In reaction (A), although no solvent is used, the reaction must be carried out in the temperature range of 0 to 15°C if the reaction is to proceed to completion. In place of the allyl amine there can be utilized any type of unsaturated hydrocarbon amine as a reactant in the above reactions. Thus, the unsaturated hydrocarbon connected to the amine can be any type of unsaturated hydrocarbon as defined for the radical $R^5$ in formulas (5) and (6) above. If it is desired to have an unsaturated hydrocarbon amine substituent group on only one portion of the malaic acid molecule, then the N-allyl maleamic acid is obtained as defined previously and such an acid is then reacted with acid isomerization catalysts in the presence of a benzene solvent, which reaction mixture is heated to reflux in the temperature range of 60°C to 80°C. The trans- product which is then obtained is reacted with allyl amine as set forth in the reactions below.

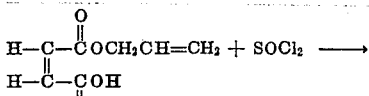

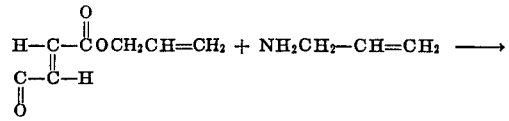

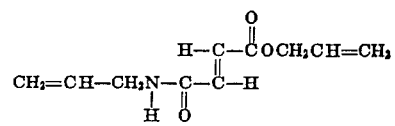

The reaction between the allyl amine and the trans-chloro allyl malaic acid maleate is carried out again at 0 to 15°C, preferably in the absence of a solvent.

As pointed out previously, in place of the allyl amine there can be used any other type of unsaturated hydrocarbon amine as a reactant, such that the unsaturated hydrocarbon is equivalent to the $R^5$ radical of formulas (5) and (6).

Further, in place of the primary amines disclosed in the above reaction, there may be used a secondary amine in which one of the hydrogens connected to the nitrogen atom is an $R^2$ radical which has been defined previously.

In order to obtain an olefinic reactant of formulas (5) or (6), where Z is equal to a phenylene group, it is desirable to utilize a Wittig reagent, which Wittig reagent, as well as its chemical utility, is discussed in detail in Organic Reactions, Vol. 14, Chapter 3, published by John Wiley & Sons in 1965. Thus, one manner by which this type of olefin can be produced wherein Z is equal to a phenylene group and $R^5$ is equivalent to a vinyl group, is exemplified by the reactions:

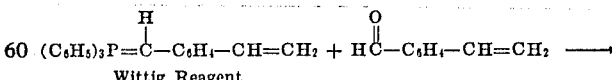

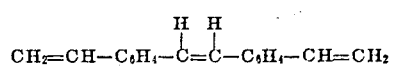

For further information as to this reaction, one is referred to the reference discussed above.

The reaction is preferably carried out in a solvent such as tetrahydrofuran or ether solvents such as 1,2- dimethoxyethane and the Glyme solvents produced by the Ansul Chemical Company. Further, in order for the reaction to proceed as desired to obtain the reaction product set forth in the above reactions, it is necessary to carry out the reaction in a temperature range of −40°C to −20°C. The above Wittig reagents which is one method for producing the desired product may also be utilized in which $R^5$ is an unsaturated group other than vinyl, such as allyl, butenyl, etc.

To obtain the intermediates of formulas (5) and (6) where Z is equal to a ketone, i.e., CO, a Grignard type of reaction is used. This type of reaction is set forth in detail in the publication Organic Synthesis, Collective Vol. 3, page 109, published by John Wiley & Sons in 1955, and in Organic Reactions, Vol. 8, Chapter 2 by D. A. Shirley published by John Wiley & Sons in 1954.

In the case where $R^5$ is allyl and $G'$ is equal to $R^5$ which is also allyl in formulas (5) and (6), the reaction can be set forth as shown below:

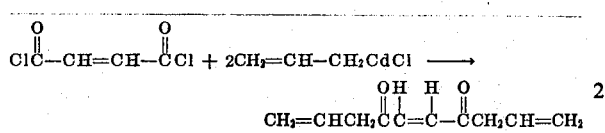

In this reaction, a solvent is used such as the solvents exemplified before with the Wittig reagents. Such solvents being exemplified by tetrahydrofuran and the ether solvents such as 1,2-dimethoxyethane. Further, in order to obtain a desired product, it is necessary to cool the reaction temperature so as to maintain it in the range of −60°C to −80°C. The above reaction can be carried out with any other Grignard reactant or organo cadmium reagents to obtain a maleate within formulas (5) and (6), where $R^5$ is equal to an unsaturated hydrocarbon other than allyl. Alternatively, one mole of the allyl Grignard reagent is reacted with one mole of the fumaryl halide reactant. As a result, the allyl substituting group is substituted for one of the chlorine atoms. The resulting product may then be hydrolyzed so as to change the remaining acid chlorine group to a carboxy acid group.

For fuller details as to the manner by which these reactants can be obtained, one is referred to the publications set forth above. The fumaryl chloride which is reacted in the last reaction set forth above is obtained by reacting malaic anhydride with phthaloyl chloride in the presence of zinc chloride as a catalyst. The reaction is allowed to proceed at a temperature in the range of 100°C to 150°C for 2 hours and the resulting fumaryl chloride is obtained as the desired reaction product. This reaction is more fully set forth in Organic Synthesis, Voll. Vol. 3, page 422 published by John Wiley & Sons, 1955. For further details as to the reaction procedure, one is referred to this reference and the disclosure of this reference is incorporated into this application by reference.

In accordance with the procedures set forth above, then there is obtained the silyl maleates and fumarates of formulas (1) and (2) and the polysiloxane maleates and fumarates of formulas (3) and (4) which are the desired compounds of the present invention.

The preferred compounds coming within the above formulas are:

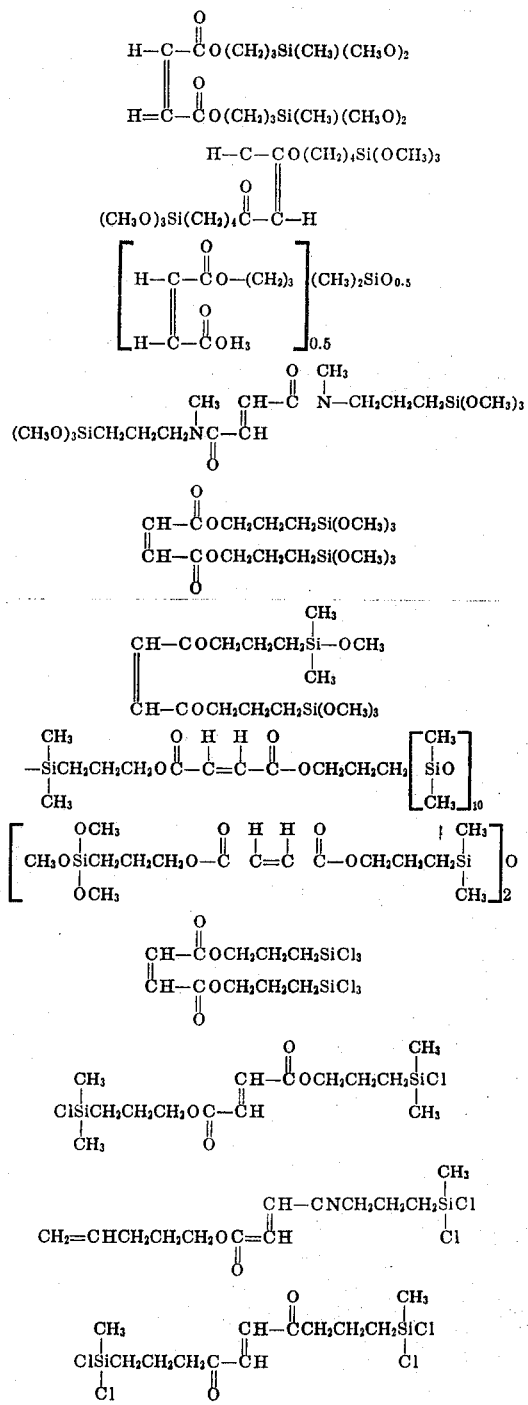

The silyl maleates of formulas (1) and (2) and the polysiloxane maleates of formulas (3) and (4) are preferably used by themselves or mixtures thereof for sizing glass fibers.

The following examples are given by way of illustration and not by way of limiting the invention illustrated above in any way or manner. All parts are by weight.

EXAMPLE 1

In a suitable 3-necked flask, a mixture of 196 parts of diallyl maleate and 0.25 ml of Lamoreaux platinum catalyst is heated to 100°C, then treated dropwise with 200 parts of trichlorosilane, the resulting reaction is exothermic and requires 3 hours for completion. Following an additional two hours heating period, gas chromatographic analysis indicated the presence of two product components corresponding to mono- and di-additions having the formulas,

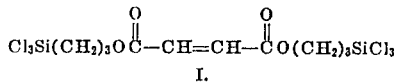
I.

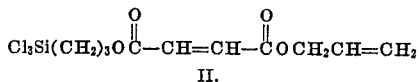
II.

Fractional distillation allowed isolation of I having a boiling point of 198°C – 209°C at 0.8 mm Hg and II having a boiling point of 180°C – 195°C at 0.8 mm Hg.

Methoxylation of 40 parts of II with 42.5 parts of methylorthoformate followed by treatment with 20 ml of methanol in the presence of ammonia resulted in a chloride-free product. Filtration to remove solids and distillation of low boiling components yielded trimethoxysilylpropyl allyl maleate of 98% purity.

Similarly, methoxylation of I by the same technique afforded bis-(trimethoxysilylpropyl)maleate.

EXAMPLE 2

First, fumaryl chloride is prepared as shown in organic Synthesis Collective Volume 3, p. 422 published by John Wiley & Sons 1955.

To a solution of 71 parts of N-methylallyl amine (1 mole) and 101 parts triethylamine in 1000 ml dry ether is added slowly with vigorous stirring, a solution of 76.5 parts of fumaryl chloride in 200 ml ether and a vigorous reaction occurs. An immediate precipitate of triethylamine hydrochloride forms. Upon complete addition, the reaction is heated at reflux for 3 hours, poured into 2 liters of water, thereby organic phase separation and stripping left behind a solid whose structure is N,N-diallyl, N,N'-dimethyl fomaramide.

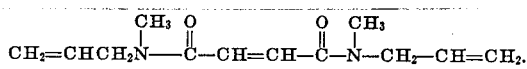

To a solution of the above material in xylene containing $10^{-4}$ parts Pt as chloroplatinic acid per equivalent of amine which is heated to 100°C, there is added slowly a molar equivalent trimethoxysilane. An exothermic reaction occurs. Upon complete addition, the reaction is maintained at 130°C for 2 hours. Vapor phase chromatography indicates two adducts are present corresponding to mono- and di-addition. They are separated by fractionation and their structure confirmed by infrared and nuclear magnetic resonance as:

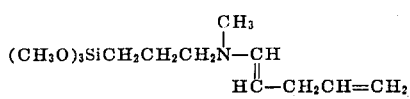
and
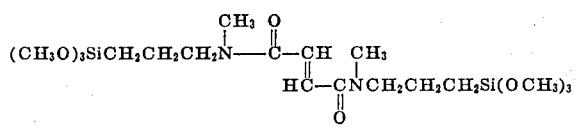

EXAMPLE 3

First, beta-benzoyl acrylic acid is prepared by the procedure in Organic Synthesis Collective Volume III, p. 109 published by John Wiley & Sons (1955). This material is converted to the beta-benzoyl acryloyl chloride by reaction with phosphorous penta-chloride in chloroform.

The acid halide is then reacted with allyl cadmium reagent to produce 1-vinylacetyl, 2-benzoyl ethylene according to the procedure established in Organic Reactions, Volume 8, Chapter 2 by D. A. Shirley published by John Wiley & Sons (1954). The final product has the structure,

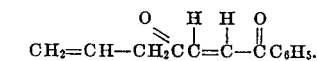

To a solution of the above ketone in xylene containing $10^{-4}$ moles of Pt per mole ketone and heated to 100°C is added slowly one molar equivalent trimethoxysilane. An exothermic reaction occurs upon complete addition. The reaction is kept at 120°C for 2 hours by application of external heat. Upon solvent removal, the product is left behind. Its structure is confirmed by infrared and nuclear magnetic resonance as:

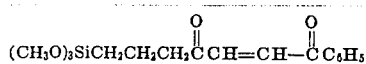

EXAMPLE 4

A polysiloxane maleate is prepared in accordance with the following reaction,

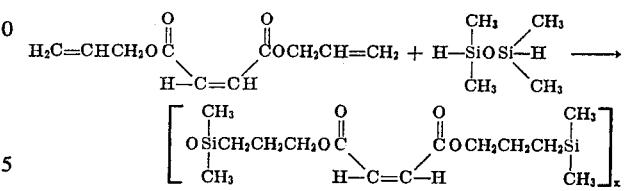

A 100 ml 3-necked flask was equipped with stirrer, thermometer, reflux condenser and addition funnel. To the flask there is charged 19.6 parts (0-1 mole) of diallyl maleate and 0.05 ml of Lamoreaux's platinum catalyst. This solution is heated to 135°C under a blanket of dry nitrogen. By means of the addition funnel, 13.4 parts (0.1 mole) of tetramethyldisiloxane is added dropwise at such a rate to maintain a reaction temperature of 140°C – 155°C. When all of the tetramethyldisiloxane had been added, the reaction mixture is stirred at a temperature of 150°C for a period of one hour, then cooled and transferred to a bottle. There is obtained 32.5 parts of a brown, clear fluid of moderate viscosity. Infrared analysis indicated the absence of silicon hydride groups and a consistency with the expected polymeric structure indicated above.

I claim:

1. A silyl compound comprising a compound selected from the group,

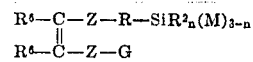

and

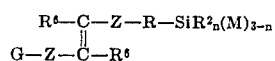

where Z is

G is $R^1$ where $R^1$ is selected from monovalent hydrocarbon radicals and halogenated monovalent hydrocarbon radicals, R is divalent hydrocarbon radicals, $R^2$ is selected from monovalent hydrocarbon radicals and halogenated monovalent hydrocarbon radicals, M is selected from $R^3O$ and $$R^3\overset{\overset{O}{\|}}{C}O$$

radicals, $R^3$ is selected from monovalent hydrocarbon radicals and halogenated monovalent hydrocarbon radicals, $R^6$ is selected from hydrogen and alkyl radicals of up to 10 carbon atoms, and $n$ is a whole number that varies from 1 to 3.

2. The compound of claim 1, wherein $R^1$ is an alkenyl radical.

3. The compound of claim 1 wherein R is propylene, M is $R^3O$ and $R^2$, $R^3$ are methyl.

4. The compound of claim 1 having the formula of trimethoxysilylpropyl allyl maleate.

5. A process for forming a silyl compound comprising reacting a compound selected from the group of, $$R^6-\overset{\overset{}{\|}}{C}-Z-R^5$$
$$R^6-\overset{\overset{}{\|}}{C}-Z-G'$$

and $$R^6-\overset{\overset{}{\|}}{C}-Z-R^5$$
$$G'-Z-\overset{\overset{}{\|}}{C}-R^6$$

with a silane of the formula,

H Si $R^2{}_nX_{3-n}$ in the presence of a platinum catalyst where Z is $$\overset{\overset{O}{\|}}{C}O$$

$G^1$ is $R^5$, where $R^5$ is selected from the group consisting of an unsaturated monovalent hydrocarbon radical and an unsaturated halogenated monovalent hydrocarbon radical, $R^2$ is selected from monovalent hydrocarbon radicals and halogenated monovalent hydrocarbon radicals, $R^6$ is selected from the group of hydrogen and alkyl radicals of up to 10 carbon atoms, X is a halogen, $n$ is a whole number that varies from 1 to 3.

6. The process of claim 5 wherein when $n$ is equal to less than 3, the resulting product is reacted in a second reaction with a compound selected from the group consisting of $R^3OH$ and $$R^3\overset{\overset{O}{\|}}{C}OH$$

wherein $R^3$ is selected from monovalent hydrocarbon radicals and monovalent halogenated hydrocarbon radicals.

7. The process of claim 5 wherein $R^5$ is allyl.

8. The process of claim 6 wherein X is chlorine and $R^3$ is methyl.

9. The process of claim 6 wherein said second reaction is carried out in the presence of an acid acceptor.

10. The process of claim 6 wherein the acid acceptor is a trialkyl amine.

11. The process of claim 6 wherein said second reaction is carried out under reduced pressures and at a temperature range of 75°C to 100°C.

12. The process of claim 6 wherein said second reaction is carried out in xylene.

* * * * *